United States Patent Office 3,069,280
Patented Dec. 18, 1962

3,069,280
FLUORINE-CONTAINING WAXES AND PROCESS FOR PREPARING THEM
Louis Spiegler, Woodbury, N.J., assignor to E. I. du Pont de Nemours and Company, Wilmington, Del., a corporation of Delaware
No Drawing. Filed Feb. 23, 1960, Ser. No. 10,089
20 Claims. (Cl. 106—271)

This invention relates to novel fluorine-containing waxes, dispersions thereof, and processes for preparing such waxes and dispersions.

Processes are known for preparing telomers of tetrafluoroethylene by polymerizing tetrafluoroethylene in the presence of various organic compounds known as telogens. Such processes generally produce a mixture of products varying from liquids to very high molecular weight products which closely approach the properties of polymerized tetrafluoroethylene. Frequently, such mixtures contain a small proportion of intermediate wax-like products. To isolate the wax-like products, it is necessary to employ complex and uneconomical separation steps. Such isolated wax-like products have limited utility and it is usually difficult or impossible to disperse them in liquids to provide dispersions which would have a more extended utility. When the telomerization is controlled to prepare waxy products without the attendant formation of non-waxy products, the waxy products and dispersions thereof usually are lacking in the properties desired for many purposes.

It is an object of this invention to provide a novel process for the preparation of fluorine-containing waxes from tetrafluororoethylene, without the attendant formation of non-waxy products, and which produces fluorine-containing waxes and dispersions of waxes which have improved properties and more extended utility. Another object is to provide a wax which is a mixture of reaction products of tetrafluoroethylene of significantly improved properties. A further object is to provide novel and improved dispersions of said novel waxes, which dispersions have a wider range of utility and particularly which are more convenient to use and, when used, provide new and improved results. Other objects are to provide new compositions of matter and to advance the art. Still other objects will appear hereinafter.

The above and other objects may be accomplished in accord with this invention which provides the process and the products hereinafter described and claimed. The novel process comprises polymerizing 1 part by weight of tetrafluoroethylene in a solution of from about 0.02 to about 0.21 part by weight of at least one silicon compound of the group consisting of a poly(dimethyl siloxane) having a molecular weight of from 162 to about 26,000 and a silane of the formula $R_4Si$ wherein each R represents a member of the group consisting of alkyl radicals of 1 to 4 carbon atoms and alkoxy radicals of 1 to 4 carbon atoms, at least one R being an alkyl radical, in from about 3 to about 20 parts by weight of a liquid reaction medium which consists of at least one chlorofluoro compound of the group consisting of 1,1,1-trichlorotrifluoroethane, 1,1,2 - trichlorotrifluoroethane, fluorotrichloromethane, and 1,2 - difluorotetrachloroethane, in the presence of a soluble free-radical generating telomerization initiator at a temperature of from about 75° C. to about 200° C. under a pressure up to about 1500 p.s.i.g. which is sufficient to maintain the liquid reaction medium predominantly in the liquid phase.

By such process, there is obtained a stable dispersion of a fluorine-containing wax in unreacted liquid reaction medium. By a "stable" dispersion is meant that the wax does not separate therefrom when the dispersion is stored or allowed to stand for long periods of time. Due to the conditions, materials, and proportions of materials employed, most of the tetrafluoroethylene reacts with all of the silicon compound and a portion of the chlorofluoro compound to produce a mixture of waxy reaction products free of non-waxy reaction products, said waxy reaction products being dispersed in the unreacted portion of the chlorofluoro compound. As so produced, the dispersion constitutes a preferred composition of this invention and is ready for use for a wide variety of purposes.

The wax (waxy reaction products) contains from about 56% to about 70% by weight of fluorine and consists essentially of a mixture of (1) about 50% to about 80% by weight of the reaction product of tetrafluoroethylene and at least one silicon compound of the group consisting of a poly(dimethyl siloxane) having a molecular weight in the range of from 162 to about 26,000 and a silane of the formula $R_4Si$ wherein each R represents a member of the group consisting of alkyl radicals of 1 to 4 carbon atoms and alkoxy radicals of 1 to 4 carbon atoms, at least one R being an alkyl radical, which reaction product contains from about 8 to about 40 tetrafluoroethylene units for each silicon atom which units form polyfluoroalkyl chains attached to carbon atoms of the silicon compound, and (2) about 50% to about 20% by weight of the telomer of tetrafluoroethylene and a saturated fluorochloro compound of the group consisting of 1,1,1-trichlorotrifluoroethane, 1,1,2 - trichlorotrifluoroethane, fluorotrichloromethane and 1,2 - difluorotetrachloroethane, which telomer contains a polyfluoroalkyl group of the formula $Cl(CF_2CF_2)_n$ wherein $n$ is an integer of from about 8 to about 40 which replaces a chlorine atom of the fluorochloro compound, said wax having a melting point in the range of from about 240° C. to about 320° C.

Such waxes are novel, hard waxes which are insoluble in water and common organic solvents including acetone, benzene, chlorobenzene, carbon tetrachloride, 1,1,2-trichlorotrifluoroethane, 1,2 - difluorotetrachloroethane, methyl ethyl ketone, methanol, ethanol, the isomeric propanols, ethyl acetate, methyl formate, dioxane, 2-ethoxy methanol, ethyl ether, hexane, octane, decane, dimethylformamide, and the like.

These waxes are useful for a wide variety of purposes. They can be applied to solid surfaces such as metals, glass, leather, plastics, textiles, painted surfaces and the like, to form films or coatings on such surfaces. Such films or coatings, after drying as by removal of the liquid dispersing medium, are clear to slightly opaque, durable, coherent, smooth, glossy and non-tacky, have an extremely low coefficient of friction, are highly repellent to water and hydrocarbon oils, and adhere firmly to such solid surfaces, and are superior to prior waxes in these respects. They are useful as polishes, friction reducing agents, mold release agents for molding resinous and polymeric materials, dry lubricants, anti-sticking agents, soil repellents, oil-proofing and water-proofing agents, and the like.

The films or coatings of the waxes of this invention can be removed from the solid surfaces to which they have been applied much more readily than prior materials that have been employed for such purposes. Such removal is usually accomplished by washing with soap and water, by other conventional efficient scouring processes. When they are on hard, smooth surfaces, they can be removed fairly well by brisk rubbing or scraping.

It is desirable to apply the waxes in the form of dispersions and then dry them by evaporation of the dispersing medium. Such drying may be accomplished, facilitated, or accelerated by the application of mild heating, currents of air or other inert gas, reduced pressure, or by a combination of such means. The dispersions of the waxes have a much wider range of utility than the isolated waxes and have many advantages thereover and over prior dispersions of other waxy substances. The dispersions can be applied to the objects to be coated by spraying, dipping, painting, or other conventional means for applying liquids or pastes to such objects.

The dispersions, as obtained by the process of this invention, will generally be preferred for most purposes. If too dilute for a particular purpose, they may be concentrated to the desired extent by distilling off the required amount of dispersing medium. If too thick for a particular purpose, they may be diluted to the desired concentration by the addition of the required amounts of the dispersing medium. Usually, the dispersions, as obtained, will contain from about 5% to about 10% by weight of solids, dispersed wax, depending upon the relative amounts of reactants employed, and will be in the form of mobile fluids. By dilution or concentration, the amount of dispersed wax may be varied from about 1% to about 50% by weight, those containing from about 20% to about 50% being in the form of paste waxes. Usually, a dispersion containing about 20% solids by weight will be most satisfactory as a paste wax. The dispersions, as obtained, may also be diluted to as low as about 0.1% by weight of wax by the addition of other neutral, inert, volatile, organic compounds or combinations thereof which are miscible with the original dispersing medium and which are liquids at normal room temperatures and a pressure of about 70 p.s.i.g.

Furthermore, all or part of the original dispersing medium may be replaced by any other neutral, inert, volatile, organic compound or combination thereof which is a liquid at normal room temperature and a pressure of about 70 p.s.i.g. Usually, the latter will be accomplished by evaporating off part of the original dispersing medium to where the dispersion is in the form of a paste containing at least about 60% by weight of wax and then adding the other dispersing medium with efficient agitation, whereby the paste-like composition will readily disperse to form a stable, homogeneous, film-forming wax dispersion. However, if the evaporation is taken to dryness, that is, if all of the dispersing medium is evaporated from the dispersion, it becomes a hard material and, when mixed with the original dispersing medium or other organic liquid, it does not swell or swells only partially and fails to revert to its original condition as a stable, homogeneous, film-forming wax dispersion. Suitable media for replacing all or part of the dispersing medium include ketones, such as acetone and methyl ethyl ketone; alcohols, such as methanol, ethanol and the isomeric propanols; esters, such as ethyl acetate and methyl formate; ethers, such as 2-ethoxymethanol and dioxane; aliphatic and aromatic hydrocarbons, such as hexane, octane, decane, benzene and toluene; dimethyl formamide, and the like. Particularly desirable as additional or substitute dispersing media are the halogenated saturated hydrocarbons which are liquid at 70 p.s.i.g. and normal room temperatures, especially, those in which the halogen is fluorine and/or chlorine.

Particularly preferred dispersing media are propellents or mixtures of propellents which are liquefied gases at 70 p.s.i.g. and normal room temperature, such as are used in preparing aerosol spray compositions for insecticides, dodorants, perfumes, hair treating agents and the like. Usually, these propellents are fluorinated or chlorofluorinated derivatives of methane and ethane. A preferred dispersing medium for preparing aerosol spray formulations of the waxes comprises from about 12 parts to about 100 parts of difluorodichloromethane and 0.1 to about 40 parts of a trichlortrifluoroethane, to which may be added up to about 80 parts of fluorotrichloromethane. Such aerosol formulations preferably will contain the wax in a concentration of about 0.1% to about 10% by weight.

The poly(dimethyl siloxanes) that may be employed in accord with this invention are the poly(dimethyl siloxanes) which have a molecular weight of from 162 to about 26,000. These poly(dimethyl siloxanes) are well known to the art, and include the linear poly(dimethyl siloxanes) which are represented by the structure

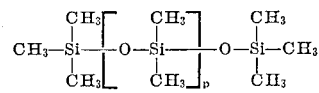

in which $p$ is an integer varying from 0 to an average of about 350 with corresponding viscosities of about 0.6 centistoke to about 1000 centistokes at 25° C. and molecular weights of from 162 to about 26,000. The simplest poly(dimethyl siloxane) is hexamethyldisiloxane ($p=0$) having the formula

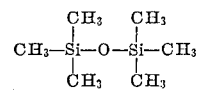

having a viscosity of 0.65 centistoke at 25° C. and a molecular weight of 162. A preferred group of linear poly(dimethyl siloxanes) are those in which $p$ is in the range of from an average of about 14 to an average of about 41 and which have a viscosity in the range of from about 10 to about 50 centistokes at 25° C. and an average molecular weight of from about 1200 to about 3200. The most preferred poly(dimethyl siloxane) is that in which $p$ is an average of about 26 and which has a viscosity of 20 centistokes at 25° C. and an average molecular weight of about 2100. The relation between the average $p$ value or the number average molecular weight and the viscosity of the poly-dimethyl siloxanes) is given in the following table:

| $p$ value | Molecular weight | Viscosity in centistokes at 25° C. |
| --- | --- | --- |
| 0 | 162 | a 0.65 |
| 14 | b 1,220 | 10 |
| 26 | b 2,100 | 20 |
| 41 | c 3,210 | 50 |
| 355 | c 26,500 | 1,000 | a Taken from Meals and Lewis in "Silicones," Reinhold Publishing Co., New York, 1959, p. 19.
b From graphical interpolation of data of Barry, J. Applied Phys., 17, 1020 (1946), Table I.
c Calculated from equation for bulk iscosities given by Barry (loc. cit.).

Also, the poly(dimethyl siloxanes) include the cyclic poly(dimethyl siloxanes) which have the formula

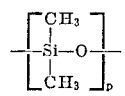

wherein $p$ is an integer of from 3 to 8, preferably 3 to 4. These cyclic poly(dimethyl siloxanes) have a molecular weight of from 222 to 593. The relation of the $p$ value to the molecular weight and the viscosity, taken from Meals and Lewis (loc. cit.), p. 19, are shown in the following table:

| p value | Molecular weight | Viscosity in centistokes at 25° C. |
|---|---|---|
| 3 | 222 | solid |
| 4 | 296 | 2.30 |
| 6 | 445 | 6.62 |
| 8 | 593 | 13.23 |

Such cyclic poly(dimethyl siloxanes) are represented by hexamethylcyclotrisiloxane

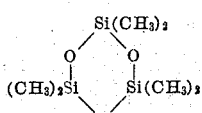

octamethylcyclotetrasiloxanes

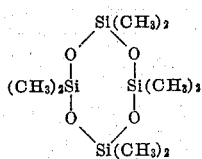

decamethylcyclopentasiloxane, dodecamethylcyclohexasiloxane, tetradecamethylcycloheptasiloxane, and hexadecamethylcyclooctasiloxane.

Mixtures of the linear poly(dimethyl siloxanes), of the cyclic poly(dimethyl siloxanes), and of the linear and cyclic poly(dimethyl siloxanes) may also be used as reactants in this invention.

The silanes which can be employed in accord with this invention are those having the formula $R_4Si$ wherein each R represents a member of the group consisting of alkyl radicals of 1 to 4 carbon atoms and alkoxy radicals of 1 to 4 carbon atoms, at least one R being an alkyl radical. Representative silanes are tetramethyl silane, $(CH_3)_4Si$, dimethyl dimethoxy silane, $$(CH_3)_2(CH_3O)_2Si$$

methyl triethoxy silane, and trimethyl ethoxy silane. Mixtures of such silanes and mixtures of one or more of such silanes with one or more poly(dimethyl siloxanes) may also be used, if desired.

The chlorofluoro compounds which can be used as reactants and liquid reaction media are 1,1,1-trichlorotrifluoroethane (M.P. 14° C., B.P. 45.7° C.), 1,1,2-trichlorotrifluoroethane (M.P. −35° C., B.P. 47.57° C.), fluorotrichloromethane (M.P. −111° C., B.P. 23.77° C.) and 1,2-difluorotetrachloroethane (M.P. 23.3° C., B.P. 92.8° C.). It will usually be preferred to employ one or both of the isomeric trichlorotrifluoroethanes, particularly the 1,1,2-trichlorotrifluoroethane. Mixtures of any two or more of such chlorofluoro compounds may be used, if desired.

The waxes of this invention are obtained by a telomerization reaction wherein tetrafluoroethylene reacts with a telogen radical and polymerizes to form polyfluoroalkyl chains which are terminated with an atom abstracted from a telogen molecule. In this case, the telogens consist of the silicon compounds and a portion of the chlorofluoro compound which is employed as the liquid reaction medium. Where the silicon compound is a poly(dimethyl siloxane), each dimethyl siloxane group will contain an average of from about 8 to about 40 tetrafluoroethylene units, usually an average of from about 8 to about 25 tetrafluoroethylene units, in the form of 1 to 2 polyfluoroalkyl chains attached to the carbon atoms of the dimethyl siloxane group. In the case of the silanes and the chlorofluoro reactants, there usually will be only one polyfluoroalkyl chain having an average of about 8 to about 40 tetrafluoroethylene units, usually an average of about 8 to about 25 tetrafluoroethylene units, per molecule of silane or per molecule of reacted chlorofluoro compound.

This reaction requires the presence of a soluble free-radical generating telomerization initiator. By "soluble" is meant that the initiator is soluble in the liquid reaction medium. Said initiators include organic peroxides, azonitriles, oxygen, and ozone which generate free radicals at the reaction temperature employed. Such telomerization initiators are well known to the art and are conventional agents for initiating telomerization reactions. Suitable organic peroxides are diethyl peroxide, tert.-butyl hydroperoxide, di-tert.-butyl peroxide, lauroyl peroxide, benzoyl peroxide, diacetyl peroxide, trichloroacetyl peroxide, trifluoroacetyl peroxide and the like. The preferred initiator is di-tert.-butyl peroxide with a reaction temperature of from about 130° C. to about 170° C. Suitable azonitriles include 2,2′-azodiisobutyronitrile and 2,2′-azobis(2,4-dimethyl-4-methoxyvaleronitrile). Usually, the telomerization initiator will be selected according to its ability to generate free radicals at the desired reaction temperature. Alternatively, the reaction temperature will be selected in accord with the temperature at which the desired or available telomerization initiator will effectively generate free radicals. The telomerization initiator usually will be employed in the range of from about 0.05% to about 3% by weight of the tetrafluoroethylene, preferably about 2% by weight.

The process is simple and easily carried out, employing the well known telomerization techniques such as, for example, those described by Barrick in U.S. Patent 2,540,088. In general, the telomerization is carried out by first charging a reaction vessel, designed to withstand the pressures employed, with the silicon compound or compounds, with the liquid reaction medium and with the telomerization initiator, and then introducing the tetrafluoroethylene into the reactor and heating to a temperature of from about 75° C. to about 200° C. If the process is carried out by a batch process, autogenous pressures of from about 300 to 600 p.s.i.g. will be generated and, as the reaction nears completion, the pressure will be observed to drop. Usually, however, the process is carried out by a continuous procedure whereby it will be necessary to subject the system to a pressure up to about 600 p.s.i.g. which is sufficient to maintain the liquid reaction medium predominantly in the liquid phase. Higher pressures up to about 1500 p.s.i.g. may be used if desired.

In order to obtain the waxy reaction products of this invention, having the desirable advantageous properties herein disclosed, and without the attendant formation of non-waxy reaction products, it is necessary to control carefully the relative proportions of the reactants. For each part of tetrafluoroethylene, it is necessary to have present in the reaction mass from about 3 to about 20 parts of the chlorofluoro liquid reaction medium and from about 0.02 to about 0.21 part of the silicon compound. Although the silicon compound is present in very small amounts, it is essential to the production of the waxy reaction products of this invention without the production of undesirable by-products. When the silicon compound is omitted, high molecular weight products are obtained which are not wax-like. Also, if materially less than 0.02 part of the silicon compound is used, the reaction product is a high molecular weight product deficient in waxy properties. On the other hand, if materially more than 0.21 part of the silicon compound is used for each part of tetrafluoroethylene, the reaction products are low molecular weight products of the nature of greases or oils. It will usually be preferred to employ from about 0.05 part to about 0.21 part of the silicon compound for each part of tetrafluoroethylene. If materially more than 20 parts by weight of the liquid reaction medium is employed for each part of tetrafluoroethylene, the process tends to become uneconomical and the resulting dispersion is too dilute for most uses. If less than about 3 parts of the liquid reaction medium is employed for each part of tetrafluoroethylene, the reaction mixture tends to become highly viscous and paste-like in the course of the reaction whereby the reaction is difficult to control owing to the poor transfer of heat through the viscous material. Usually, it will be preferred to employ from about 5 parts to about 15 parts by weight of the liquid reaction medium per part of tetrafluoroethylene, and most preferably about 10 parts by weight.

In order to more clearly illustrate this invention, preferred modes of carrying it into effect and the advantageous results to be obtained thereby, the following examples are given in which the amounts and proportions are by weight except where specifically indicated otherwise.

Example 1

A stainless steel autoclave fitted with a stirrer was filled with 1.2 liters of a solution consisting of 1,1,2-trichlorotrifluoroethane (1.84 kg. or 9.8 moles) containing 0.98% by weight of a poly(dimethyl siloxane) which had a viscosity of 20 centistokes at 25° C. and a molecular weight of about 2100 (18 g. or about 0.01 mole), and 0.29% of di-tert.-butyl peroxide (5.3 g. or .04 mole). The reactor was closed, heated to 168° C. to 170° C. and placed and kept under a pressure of 600 p.s.i.g. Then, compressed gaseous tetrafluoroethylene (TFE) was fed into the autoclave at a rate of 282 g. (2.82 moles) per hour. At the same time, additional amounts of the trichlorotrifluoroethane solution of the other reactants, with which the autoclave was originally charged, was continuously passed into the reactor at the rate of 3120 g. per hour to keep the reactor full as product was continuously withdrawn, still maintaining the pressure on the reactor at 600 p.s.i.g. After about an hour of operating, a steady state was reached; over 96% of the tetrafluoroethylene fed to the autoclave was reacted and the withdrawn product amounted to 3.4 to 3.5 kg. per hour of a dispersion of fluorowax in trichlorotrifluoroethane containing 9.3% by weight of solids. On the basis of the input and output after the steady state was reached, there was employed a weight ratio of trichlorotrifluoroethane:TFE of 10:1, and a weight ratio of poly(dimethyl siloxane):TFE of 0.1:1. Complete evaporation of the unreacted trichlorotrifluoroethane from a sample of the product dispersion yielded a wax melting at 290° C. to 305° C. and analyzing 64.4% F, 0.7% Cl and 1.2% Si, which corresponds to 73% by weight of the siloxane reaction product containing an average of about 16 tetrafluoroethylene units for each atom of silicon, and about 27% by weight of the trichlorotrifluoroethane telomer. A film of the wax possessed high water repellency as shown by the advancing contact angle of 108±5° against water. It also exhibited high oil repellency with an advancing contact angle of 35±3° against hexadecane. The advancing contact angles were measured by the procedure described by Bigelow et al. in J. Colloid Sci., 1, 520 (1946). Films of the wax, deposited on glass, steel, and a dark colored cotton fabric by spraying the trichlorotrifluoroethane dispersion, were clear, adherent, glossy coatings.

The above procedure was repeated with the concentration of the poly(dimethyl siloxane) in the trichlorotrifluoroethane increased to 1.96% and the autoclave temperature kept at 155° C. This concentration provided a weight ratio of poly(dimethyl siloxane):TFE charged of 0.21:1, while the trichlorotrifluoroethane:TFE ratio charged remained the same. Over 90% of the tetrafluoroethylene fed to the reactor was converted to polymeric product. The product dispersion contained 8.1% by weight of a wax having a melting range of 270° C. to 295° C. and analyzing 56.8% F, 1.0% Cl and 2.5% Si which corresponds to about 80% by weight of the siloxane reaction product containing an average of about 8 tetrafluoroethylene units for each atom of silicon, and about 20% by weight of the trichlorotrifluoroethane telomer.

Owing to the higher concentration of poly(dimethyl siloxane), the resulting fluorowax was somewhat softer as indicated by its lower melting range compared with the wax obtained in the above first procedure. The product dispersion provides an effective dry lubricant, imparts oil and water repelling properties to substrates, and is particularly suited for use as a mold release agent and shoe polish. When sprayed on leather shoes as an aerosol, the fluorowax dispersion deposits on the leather a uniform film that becomes, when buffed, a high gloss, water repellent polish. A film of the wax had an advancing contact angle of over 100° against water and 34±3° against hexadecane.

Example 2

The procedure of Example 1 was followed to polymerize tetrafluoroethylene in the presence of trichlorotrifluoroethane containing 0.98% by weight of hexamethyl disiloxane, $(CH_3)_3SiOSi(CH_3)_3$, and 0.29% of di-tert.-butyl peroxide. The temperature was maintained at 165° C. to 170° C., and the pressure was held at 600 p.s.i.g. The tetrafluoroethylene, at a rate of 2.82 moles per hour, and the trichlorotrifluoroethane solution, at a rate of 16.7 moles per hour of trichlorotrifluoroethane, were continuously fed to the reactor while a product fluorowax dispersion containing 8.6% by weight of solids was continuously withdrawn from the autoclave. The weight ratio of hexamethyl disiloxane:TFE fed was 0.1:1. The fluorowax, obtained on evaporating the trichlorotrifluoroethane, melted over the range of 250° C. to 285° C. and analyzed 69.5% F, 1.1% Cl, and 1.4% Si which corresponds to about 67% by weight of the siloxane reaction product containing an average of about 25 tetrafluoroethylene units for each atom of silicon, and about 33% by weight of the trichlorotrifluoroethane telomer. Films of the wax on glass exhibited high water repellency with an advancing contact angle of over 100° and high oil repellency with an advancing contact angle against hexadecane of 67±3°, measurements being made by the method of Bigelow et al. referred to in Example 1.

Example 3

The procedure of Example 1 was followed to polymerize tetrafluoroethylene in the presence of trichlorotrifluoroethane containing 0.49% by weight of octamethylcyclotetrasiloxane (0.018 mole per mole of tetrafluoroethylene) and 0.25% of di-tert.-butyl peroxide. The temperature was maintained at 155° C. to 165° C., and the pressure was held at 600 p.s.i.g. The tetrafluoroethylene was continuously fed to the autoclave at a rate of 2.82 moles per hour, while 16.7 moles/hour of trichlorotrifluoroethane, containing the octamethylcyclotetrasiloxane and peroxide catalyst, were continuously added to the reactor. Thus, there was employed a weight ratio of octamethylcyclotetrasiloxane:TFE of 0.05:1 and a weight ratio of trichlorotrifluoroethane:TFE of 10:1. The continuously withdrawn fluorowax dispersion product contained 8.1% by weight of solids resulting from over 90% conversion of the tetrafluoroethylene. The isolated fluorowax melted from 260° C. to 290° C. and analyzed 69.5% F, 0.7% Cl and 1.2% Si which corresponds to about 70% by weight of the octamethylcyclotetrasiloxane reaction product containing an average of about 15 tetrafluoroethylene units for each atom of silicon, and about 30% by weight of the trichlorotrifluoroethane telomer. Films of the wax, deposited from the dispersion, are clear, adherent, and durable and exhibit a distinctive combination of lubricating, water repellency, oil repellency, and polishing properties. A film of the wax had an advancing contact angle of over 100° against water and of 58° against hexadecane.

Example 4

When the procedure of Example 1 was repeated using 0.49% of tetramethyl silane, $Si(CH_3)_4$, (a weight ratio of tetramethyl silane:TFE of 0.05:1) in place of the poly (dimethyl siloxane), 0.25% of di-tert.-butyl peroxide, and holding the temperature at 155° C. to 165° C., a fluorowax dispersion containing 7.1% by weight of wax melting at 250° C. to 285° C. was obtained. This wax analyzed 67.5% F, 1.7% Cl and 1.0% Si, which corresponds to about 50% of the tetramethyl silane reaction product containing an average of about 13 tetrafluoroethylene units for each atom of silicon, and about 50% of the trichlorotrifluoroethane telomer. From the dispersion, there was deposited on glass, steel, wood, and leather, clear, smooth, durable, water and oil repellent films. A film of the wax had an advancing contact angle of over 100° against water and of 68° against hexadecane.

It will be understood that the preceding examples are given for illustrative purposes solely and that this invention is not limited to the specific embodiments described therein. On the other hand, within the limits set forth in the general description, the materials, proportions and conditions employed may be considerably varied without departing from the spirit or scope of this invention.

Some representative general fields of use of the compositions of the present invention are on automobiles, automobile accessories, boats, skis, other sporting equipment, paper, glass, industrial machinery and the like. More specific uses are as lubricants for moving and sliding metal parts as in locks, latches, antennae, fishing rod ferrules, cameras and photo equipment, tripods, zippers, pumps, reels, scissors, shears, bearings, gears, nuts and bolts, instruments, sole plate of planes, drill bits, and saws; as lubricants or coatings for other non-metallic materials such as threads, ropes, dance floor wax, bowling alley wax, playing cards, the inside of rubbers and galoshes, tire rims, pedals, slide rules, metal and wooden drawers, hosiery forms, lace-making machines, gasket packings; as soil repellent surface coatings to retard soiling and to make easier the cleaning of surfaces of such objects as golf clubs, golf balls, exhaust fans, trash cans, windows, bathtubs, brick and flagstone, tires, tarpaulins, tents, automobile seats, luggage; as anti-sticking agents on snow shovels, plows, on sticking doors, windows and sliding drawers, on lawn mowers to prevent sticking of grass clippings, and on irons to make ironing easier. They may also be used to waterproof paper, textiles, wood, painted surfaces and the like and also impart oil repellent properties to the surfaces treated with them; and as the wax ingredient of polishes for shoes, furniture, automobiles, leather, linoleum and the like.

The wax compositions of this invention also have significant utility in reducing friction in various industrial machines, particularly as a substitute for the conventional graphite, to give acceptable lubrication and also to overcome the objection inherent in the use of graphite which is usually in powder form and which is difficult to remove, e.g. from lace produced by a lace-making machine. For example, if lace should accumulate the wax as a result of coming into contact with the wax which is used as a lubricant in the lace-making machine, the wax is easily removed from the lace during the scouring treatment ordinarily given to the lace after its manufacture. In utilizing the wax compositions as lubricants in industrial machines, it is usually desirable to take appropriate steps to insure that all of the friction surfaces of the particular machine are coated with the composition. Many other uses of the compositions of this invention will be readily apparent to those skilled in the art.

From all of the above it will be apparent that this invention provides a novel process for producing new and valuable compositions in high yields, which process is simple and easy to operate and control. Also, this invention provides novel waxes, particularly novel wax dispersions, which have new, unobvious and very valuable advantages properties and which are useful for a wide variety of purposes. Accordingly, it will be apparent that this invention constitutes a valuable contribution to and advance in the art.

The embodiments of the invention in which an exclusive property or privilege is claimed are defined as follows:

1. The process which comprises polymerizing 1 part by weight of tetrafluoroethylene in a solution of from about 0.02 to about 0.21 part by weight of at least one silicon compound of the group consisting of a poly(dimethyl siloxane) having a molecular weight of from 162 to about 26,000 and a silane of the formula $R_4Si$ wherein each R represents a member of the group consisting of alkyl radicals of 1 to 4 carbon atoms and alkoxy radicals of 1 to 4 carbon atoms, at least one R being an alkyl radical, in from about 3 to about 20 parts by weight of a liquid reaction medium which consists of at least one chlorofluoro compound of the group consisting of 1,1,1-trichlorotrifluoroethane, 1,1,2 - trichlorotrifluoroethane, fluorotrichloromethane, and 1,2-difluorotetrachloroethane, in the presence of a soluble free-radical generating telomerization initiator at a temperature of from about 75° C. to about 200° C. under a pressure up to about 1500 p.s.i.g. which is sufficient to maintain the liquid reaction medium predominantly in the liquid phase.

2. The process which comprises polymerizing 1 part by weight of tetrafluoroethylene in a solution of from about 0.02 to about 0.21 part by weight of a poly(dimethyl siloxane) having a molecular weight of from 162 to about 26,000 in from about 3 to about 20 parts by weight of a liquid reaction medium which consists of at least one chlorofluoro compound of the group consisting of 1,1,1-trichlorotrifluoroethane, 1,1,2-trichlorotrifluoroethane, fluorotrichloromethane, and 1,2-difluorotetrachloroethane in the presence of a soluble free-radical generating telomerization initiator at a temperature of from about 75° C. to about 200° C. under a pressure up to about 1500 p.s.i.g. which is sufficient to maintain the liquid reaction medium predominantly in the liquid phase.

3. The process which comprises polymerizing 1 part by weight of tetrafluoroethylene in a solution of from about 0.1 to about 0.21 part by weight of a linear poly(dimethyl siloxane) having a molecular weight of from 162 to about 2100 in about 10 parts by weight of a trichlorotrifluoroethane in the presence of a soluble free-radical generating telomerization initiator at a temperature of from about 145° C. to about 200° C. under a pressure of from about 300 to about 600 p.s.i.g. which is sufficient to maintain the trichlorotrifluoroethane predominantly in the liquid phase.

4. The process which comprises polymerizing 1 part by weight of tetrafluoroethylene in a solution of from about 0.05 to about 0.21 part by weight of a cyclic poly(dimethyl siloxane) having a molecular weight of from 222 to about 593 in about 10 parts by weight of a trichlorotrifluoroethane in the presence of a soluble free-radical generating telomerization initiator at a temperature of from about 145° C. to about 200° C. under a pressure of from about 300 to about 600 p.s.i.g. which is sufficient to maintain the trichlorotrifluoroethane predominantly in the liquid phase.

5. The process which comprises polymerizing 1 part by weight of tetrafluoroethylene in a solution of from about 0.02 to about 0.21 part by weight of a silane of the formula $R_4Si$ wherein each R represents a member of the group consisting of alkyl radicals of 1 to 4 carbon atoms and alkoxy radicals of 1 to 4 carbon atoms, at least one R being an alkyl radical, in about 10 parts by weight of a trichlorotrifluoroethane in the presence of a soluble free-radical generating telomerization initiator at a temperature of from about 145° C. to about 200° C. under a pressure of from about 300 to about 600 p.s.i.g. which is sufficient to maintain the trichlorotrifluoroethane predominantly in the liquid phase.

6. A wax containing from about 56% to about 70% by weight of fluorine which consists essentially of a mixture of (1) about 50% to about 80% by weight of the reaction product of tetrafluoroethylene and at least one silicon compound of the group consisting of a poly(dimethyl siloxane) having a molecular weight in the range of from 162 to about 26,000 and a silane of the formula $R_4Si$ wherein each R represents a member of the group consisting of alkyl radicals of 1 to 4 carbon atoms and alkoxy radicals of 1 to 4 carbon atoms, at least one R being an alkyl radical, which reaction product contains from about 8 to about 40 tetrafluoroethylene units for each silicon atom which units form polyfluoroalkyl chains attached to carbon atoms of the silicon compound, and (2) about 50% to about 20% by weight of the telomer of tetrafluoroethylene and a saturated fluorochloro compound of the group consisting of 1,1,1-trichlorotrifluoroethane, 1,1,2 - trichlorotrifluoroethane, fluorotrichloromethane and 1,2-difluorotetrachloroethane, which telomer contains a polyfluoroalkyl group of the formula $$Cl(CF_2CF_2)_n$$

wherein $n$ is an integer of from about 8 to about 40 which replaces a chlorine atom of the fluorochloro compound, said wax having a melting point in the range of from about 240° C. to about 320° C.

7. A wax containing from about 56% to about 70% by weight of fluorine which consists essentially of a mixture of (1) about 50% to about 80% by weight of the reaction product of tetrafluoroethylene and a poly(dimethyl siloxane) having a molecular weight in the range of from 162 to about 26,000, which reaction product contains from about 8 to about 40 tetrafluoroethylene units for each silicon atom which units form polyfluoroalkyl chains attached to carbon atoms of the poly(dimethyl siloxane), and (2) about 50% to about 20% by weight of the telomer of tetrafluoroethylene and a trichlorotrifluoroethane, which telomer contains a polyfluoroalkyl group of the formula $Cl(CF_2CF_2)_n$ wherein $n$ is an integer of from about 8 to about 40 which replaces a chlorine atom of the trichlorotrifluoroethane, said wax having a meling point in the range of from about 240° C. to about 320° C.

8. A wax containing from about 56% to about 70% by weight of fluorine which consists essentially of a mixture of (1) about 67% to about 80% by weight of the reaction product of tetrafluoroethylene and a linear poly(dimethyl siloxane) having a molecular weight in the range of from 162 to about 2100, which reaction product contains from about 8 to about 25 tetrafluoroethylene units for each silicon atom which units form polyfluoroalkyl chains attached to carbon atoms of the poly(dimethyl siloxane), and (2) about 33% to about 20% by weight of the telomer of tetrafluoroethylene and a trichlorotrifluoroethane, which telomer contains a polyfluoroalkyl group of the formula $Cl(CF_2CF_2)_n$ wherein $n$ is an integer of from about 8 to about 25 which replaces a chlorine atom of the trichlorotrifluoroethane, said wax having a melting point in the range of from about 250° C. to about 305° C.

9. A wax containing from about 56% to about 65% by weight of fluorine which consists essentially of a mixture of (1) about 73% to about 80% by weight of the reaction product of tetrafluoroethylene and a linear poly(dimethyl siloxane) having a molecular weight of about 2100, which reaction product contains from about 8 to about 16 tetrafluoroethylene units for each silicon atom which units form polyfluoroalkyl chains attached to carbon atoms of the poly(dimethyl siloxane), and (2) about 27% to about 20% by weight of the telomer of tetrafluoroethylene and a trichlorotrifluoroethane, which telomer contains a polyfluoroalkyl group of the formula $Cl(CF_2CF_2)_n$ wherein $n$ is an integer of from about 8 to about 25 which replaces a chlorine atom of the trichlorotrifluoroethane, said wax having a melting point in the range of from about 270° C. to about 305° C.

10. A wax containing about 69.5% by weight of fluorine which consists essentially of a mixture of (1) about 67% by weight of the reaction product of tetrafluoroethylene and hexamethyl disiloxane, which reaction product contains about 25 tetrafluoroethylene units for each silicon atom of the hexamethyl disiloxane which units form polyfluoroalkyl chains attached to carbon atoms of the hexamethyl disiloxane, and (2) about 33% by weight of the telomer of tetrafluoroethylene and a trichlorotrifluoroethane, which telomer contains a polyfluoroalkyl group of the formula $Cl(CF_2CF_2)_n$ wherein $n$ is an integer of from about 8 to about 25 which replaces a chlorine atom of the trichlorotrifluoroethane, said wax having a melting point in the range of from about 250° C. to about 285° C.

11. A wax containing from about 56% to about 70% by weight of fluorine which consists essentially of a mixture of (1) about 50% to about 80% by weight of the reaction product of tetrafluoroethylene and a cyclic poly-(dimethyl siloxane) having a molecular weight in the range of from 222 to 593, which reaction product contains from about 8 to about 40 tetrafluoroethylene units for each silicon atom which units form polyfluoroalkyl chains attached to carbon atoms of the cyclic poly-(dimethyl siloxane), and (2) about 50% to about 20% by weight of the telomer of tetrafluoroethylene and a trichlorotrifluoroethane, which telomer contains a polyfluoroalkyl group of the formula $Cl(CF_2CF_2)_n$ wherein $n$ is an integer of from about 8 to about 25 which replaces a chlorine atom of the trichlorotrifluoroethane, said wax having a melting point in the range of from about 240° C. to about 320° C.

12. A wax containing about 69.5% by weight of fluorine which consists essentially of a mixture of (1) about 70% by weight of the reaction product of tetrafluoroethylene and octamethylcyclotetrasiloxane, which reaction product contains about 15 tetrafluoroethylene units for each silicon atom which units form polyfluoroalkyl chains attached to carbon atoms of the octamethylcyclotetrasiloxane, and (2) about 30% by weight of the telomer of tetrafluoroethylene and a trichlorotrifluoroethane, which telomer contains a polyfluoroalkyl group of the formula $Cl(CF_2CF_2)_n$ wherein $n$ is an integer of from about 8 to about 25 which replaces a chlorine atom of the trichlorotrifluoroethane, said wax having a melting point in the range of from about 260° C. to about 290° C.

13. A wax containing from about 56% to about 70% by weight of fluorine which consists essentially of a mixture of (1) about 50% to about 80% by weight of the reaction product of tetrafluoroethylene and a silane of the formula $R_4Si$ wherein each R represents a member of the group consisting of alkyl radicals of 1 to 4 carbon atoms and alkoxy radicals of 1 to 4 carbon atoms, at least one R being an alkyl radical, which reaction product contains from about 8 to about 40 tetrafluoroethyiene units for each molecule of the silane which units form polyfluoroalkyl chains attached to carbon atoms of the silane, and (2) about 50% to about 20% by weight of the telomer of tetrafluoroethylene and a trichlorotrifluoroethane, which telomer contains a polyfluoroalkyl group of the formula $Cl(CF_2CF_2)_n$ wherein $n$ is an integer of from about 8 to about 40 which replaces a chlorine atom of the fluorochloro compound, said wax having a melting point in the range of from about 240° C. to about 320° C.

14. A wax containing about 67.5% by weight of fluorine which consists essentially of a mixture of (1) about 50% by weight of the reaction product of tetrafluoroethylene and tetramethyl silane, which reaction product contains about 13 tetrafluoroethylene units for each molecule of the tetramethyl silane which units form polyfluoroalkyl chains attached to carbon atoms of the tetramethyl silane, and (2) about 50% by weight of the telomer of tetrafluoroethylene and a trichlorotrifluoroethane, which telomer contains a polyfluoroalkyl group of the formula $Cl(CF_2CF_2)_n$ wherein $n$ is an integer of from about 8 to about 25 which replaces a chlorine atom of the fluorochloro compound, said wax having a melting point in the range of from about 250° C. to about 285° C.

15. A stable dispersion of from about 0.1% to about 50% by weight of a wax of claim 6 in a neutral, inert, volatile organic compound which is a liquid at 70 p.s.i.g. and normal room temperatures.

16. A stable dispersion of from about 0.1% to about 50% by weight of a wax of claim 7 in a neutral, inert, volatile organic compound which is a liquid at 70 p.s.i.g. and normal room temperatures.

17. A stable dispersion of from about 0.1% to about 50% by weight of a wax of claim 8 in a neutral, inert, volatile organic compound which is a liquid at 70 p.s.i.g. and normal room temperatures.

18. A stable dispersion of from about 0.1% to about 50% by weight of a wax of claim 11 in a neutral, inert, volatile organic compound which is a liquid at 70 p.s.i.g. and normal room temperatures.

19. A stable dispersion of from about 0.1% to about 50% by weight of a wax of claim 13 in a neutral, inert, volatile organic compound which is a liquid at 70 p.s.i.g. and normal room temperatures.

20. A stable dispersion of from about 5% to about 20% by weight of a wax of claim 6 in a trichlorotrifluoroethane.

References Cited in the file of this patent
FOREIGN PATENTS
1,067,598  Germany _____ Oct. 22, 1959